US008294297B2

(12) United States Patent
Linkhart et al.

(10) Patent No.: US 8,294,297 B2
(45) Date of Patent: Oct. 23, 2012

(54) SCALABLE DISTRIBUTED REDUNDANCY

(75) Inventors: Charles O. Linkhart, Shingle Springs, CA (US); Yatish C. Mishra, Davis, CA (US); George Macricostas, Incline Village, NV (US)

(73) Assignee: Ragingwire Enterprise Solutions, Inc., Sacramento, CA (US)

( * ) Notice: Subject to any disclaimer, the term of this patent is extended or adjusted under 35 U.S.C. 154(b) by 206 days.

(21) Appl. No.: 12/184,115

(22) Filed: Jul. 31, 2008

(65) Prior Publication Data
US 2009/0033153 A1 Feb. 5, 2009

Related U.S. Application Data

(60) Provisional application No. 60/953,878, filed on Aug. 3, 2007.

(51) Int. Cl.
H02J 9/00 (2006.01)
(52) U.S. Cl. .............................. 307/64; 307/65; 307/66
(58) Field of Classification Search .................. None
See application file for complete search history.

(56) References Cited

U.S. PATENT DOCUMENTS

| | | | |
|---|---|---|---|
| 4,340,823 A | 7/1982 | Miyazawa | |
| 5,081,367 A | 1/1992 | Smith et al. | |
| 5,581,133 A | 12/1996 | Smith et al. | |
| 5,642,002 A | 6/1997 | Mekanik et al. | |
| 5,646,459 A | 7/1997 | Hatate et al. | |
| 5,739,595 A * | 4/1998 | Mekanik et al. | 307/64 |
| 5,745,356 A * | 4/1998 | Tassitino et al. | 363/71 |
| 5,770,897 A | 6/1998 | Bapat et al. | |
| 5,811,960 A | 9/1998 | Van Sickle et al. | |
| 5,856,712 A * | 1/1999 | Suzuki et al. | 307/64 |
| 6,134,124 A | 10/2000 | Jungreis et al. | |
| 6,150,736 A * | 11/2000 | Brill | 307/64 |
| 6,191,500 B1 | 2/2001 | Toy | |
| 6,433,444 B1 | 8/2002 | de Vries | |
| 6,538,345 B1 * | 3/2003 | Maller | 307/86 |
| 6,664,659 B1 * | 12/2003 | Adi | 307/64 |
| 6,737,762 B2 | 5/2004 | Koenig | |
| 6,768,223 B2 | 7/2004 | Powell et al. | |
| 6,768,224 B2 * | 7/2004 | Shen et al. | 307/64 |
| 6,774,507 B1 * | 8/2004 | Byers et al. | 307/64 |
| 6,906,434 B1 * | 6/2005 | Koeppe et al. | 307/64 |
| 6,906,435 B1 * | 6/2005 | Lin et al. | 307/66 |
| 7,061,141 B2 | 6/2006 | Yamamoto | |
| 7,119,457 B1 * | 10/2006 | Flegel | 307/64 |
| 7,129,599 B2 * | 10/2006 | Divan et al. | 307/65 |
| RE39,710 E * | 7/2007 | Young et al. | 307/64 |
| 7,265,458 B2 | 9/2007 | Edelen et al. | |
| 7,274,112 B2 | 9/2007 | Hjort et al. | |
| 7,400,066 B2 | 7/2008 | Tassitino, Jr. et al. | |
| 7,418,314 B2 | 8/2008 | Rasmussen et al. | |
| 7,432,615 B2 | 10/2008 | Hjort | |
| 7,450,406 B2 | 11/2008 | Glauser | |

(Continued)

*Primary Examiner* — Rexford Barnie
*Assistant Examiner* — Justen Fauth
(74) *Attorney, Agent, or Firm* — Nixon Peabody LLP; Joseph Bach, Esq.

(57) ABSTRACT

A scalable power distribution system for a data center and methods for scaling a power distribution system are described. The scalable power distribution system includes a transformer that is connected to a load at its output. The input of the transformer is connected to two isolation switches. A source is connected to one switch at all times, and the source can be switched without affecting power to the load by synchronizing the two sources at the transformer before switching sources. The load is not de-energized at any time during the transfer process.

18 Claims, 13 Drawing Sheets

U.S. PATENT DOCUMENTS

| | | |
|---|---|---|
| 7,456,518 B2 | 11/2008 | Hjort et al. |
| 7,459,803 B2 | 12/2008 | Mosman |
| 7,462,955 B2 * | 12/2008 | McNamara et al. ............ 307/64 |
| 7,514,815 B2 | 4/2009 | Paik et al. |
| 7,554,220 B2 * | 6/2009 | Sugawara ....................... 307/64 |
| 7,566,988 B2 | 7/2009 | Heber et al. |
| 7,566,990 B2 | 7/2009 | Loucks et al. |
| 7,569,949 B2 | 8/2009 | Lathrop et al. |
| 7,687,936 B2 * | 3/2010 | Mariasis et al. ................ 307/64 |
| 7,714,462 B2 | 5/2010 | Chen |
| 2003/0184160 A1 | 10/2003 | Yamamoto |
| 2004/0084965 A1 | 5/2004 | Welches et al. |
| 2004/0201282 A1 | 10/2004 | Kado et al. |
| 2005/0073783 A1 * | 4/2005 | Luo et al. ........................ 361/62 |
| 2005/0162792 A1 * | 7/2005 | Wang et al. ..................... 361/62 |
| 2005/0200205 A1 * | 9/2005 | Winn et al. ..................... 307/64 |
| 2006/0022524 A1 | 2/2006 | Bryde et al. |
| 2006/0028069 A1 | 2/2006 | Loucks et al. |
| 2006/0046107 A1 | 3/2006 | Lindsey |
| 2006/0138867 A1 | 6/2006 | Tian et al. |
| 2006/0220462 A1 | 10/2006 | O'Leary |
| 2006/0221523 A1 | 10/2006 | Colombi et al. |
| 2008/0265681 A1 | 10/2008 | Pfitzer et al. |
| 2008/0278003 A1 | 11/2008 | Pouchet et al. |
| 2008/0303347 A1 | 12/2008 | Zajkowski |
| 2009/0009001 A1 | 1/2009 | Marwali et al. |
| 2009/0033153 A1 | 2/2009 | Linkhart et al. |

* cited by examiner

SCALABLE DISTRIBUTED REDUNDANCY

CROSS-REFERENCE TO RELATED APPLICATIONS

This application claims the benefit of U.S. Provisional Application No. 60/953,878, filed Aug. 3, 2007, entitled "SCALABLE DISTRIBUTED REDUNDANCY," the entirety of which is hereby incorporated by reference.

BACKGROUND

1. Field

The subject invention relates to power distribution systems and in particular to a scalable power distribution system.

2. Related Art

Power distribution systems are typically used in facilities to convert transmitted high voltage energy to energy that is suitable for its intended use and deliver that energy within the facility. These facilities (e.g., hospitals, data centers, etc.) have a load (e.g., computers, heating and air conditioning equipment, etc.) to which the energy is delivered by the power distribution system. An exemplary power distribution system that is used in these facilities is a distributed redundant power system.

In a distributed redundant power distribution system, N+1 redundancy is achieved by providing two sources of power to a single load (e.g., servers, chillers, etc.) from two diverse, totally independent sources. When there are only two such sources, there is only one combination (A+B). The system, therefore, has 2N redundancy. When the system has three sources (A, B and C), there are three combinations of two: A and B, B and C and A and C. Similarly, when there are four sources (A, B, C, and D), there are six combinations of two: A and B, B and C, A and C, A and D, B and D an C and D. When there are five systems, there are ten combinations; and, when there are six systems, there are sixteen combinations.

Loading of the system using multiple sources can be as high as (1−1/N) times the total system capacity without overloading any system in the event of a single source failure. The criteria for achieving this maximum limit are that every possible combination of two systems needs to provide two-source power to an equal amount of load. For example, for five sources, there are ten load blocks, each of which needs to supply two source loads of 10% of the total load served. The total load can then be as high as 80% of the total system capacity.

For five 675 KW sources, for example, the total capacity is 3375 KW which would yield 2700 KW of distributed N+1 capacity as long as each of the ten combinations of two sources is loaded to 270 KW, split evenly between the two sources. This configuration and loading would put a normal load of 540 KW on each source. Failure of any source causes the paired source in each of the four two-source combinations with that failed unit to assume half the 270 KW supplied by the two-source combination. This load assumption raises each of the four remaining sources from 540 KW to their maximum capacity of 675 KW.

Implementation of a full system design as described above is relatively straightforward if N is a known number and the entire system is built before the critical load is connected. In practice, however, economic forces encourage the construction and placement in service of small systems that grow over time. Typically, initial construction includes two UPS modules (UPSA and UPSB), each rated 675 KW full load. For this configuration, all two-source loads are fed from UPS A and UPS B and the total capacity of the system is half of the connected capacity of 1350 KW (675 KW). When a third UPS is added, there are three possible combinations of two source loads, as described above, bringing the total capacity of the system to 1350 KW (450 KW each). When a fourth UPS is added, there are six possible combinations of two-source loads, as described above, bringing the total capacity of the system to 2025 KW (337.5 KW each). When a fifth UPS is added, there are ten possible combinations of two-source loads, as described above, bringing the total capacity of the system to 2700 KW (270 KW each).

The trend in the above example is for the total capacity of each two-source load combination to decrease as the overall system capacity increases. However, to use all of the available power with the two sources, ⅓ of the available power is planned to be moved to implement full capacity when the third UPS is added; then, ¼ of the load is planned to be moved to implement full capacity when the fourth UPS is added; and ⅕ of the load is planned to be moved to implement full capacity when the fifth UPS is added.

Furthermore, when the third UPS is added to the system, the load combination may need to be changed. For example, the B connection may need to be changed to C to make it an A and C load to balance the system. When the connection is changed, the B connection is removed and the circuit is rerun or rerouted and connected to C. A problem with changing the connection is a loss of redundancy during the transition. For example, as soon as B is disconnected, the load has only one source. If the end devices are truly two-source, this may be no problem at all. However, if the A source fails while the B source is being changed to C, this reduction in redundancy results in a critical load interruption. In many cases, this risk of critical load interruption is unacceptable. In addition, the configuration prevents full capacity utilization at earlier stages of construction and presents a construction sequence level of difficulty that drives costs up and significantly delays full implementation.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

The systems and methods of the invention allow the power distribution system to grow step by step without interruptions to the load or reductions in the redundancy of the power distribution system. To allow the power distribution system to grow step by step without these interruptions or reductions, the source to load connections can be changed or moved without interruptions to the load or reduction in the redundancy of the power distribution system by providing a transformer having two isolation switches for each source-load combination.

According to an aspect of the invention, a scalable power distribution system is provided. The scalable power distribution system includes a transformer coupled with a load; a first isolation switch connected to an input of the transformer; a second isolation switch connected to the input of the transformer; and a first power source connected to the first isolation switch; wherein a second power source is connectable with the second isolation switch, the second power source and the first source synchronizable at the transformer.

Each of the first power source and second power source may be an uninterruptible power supply (UPS).

The first isolation switch and the second isolation switch may be manual switches or automatic switches.

The system may also include a second transformer coupled with the load; a third isolation switch coupled with the second transformer; and a fourth isolation switch coupled with the second transformer. The second power source may be connected to the first isolation switch and wherein the first power source is connected to the third isolation switch.

The system may also include a third transformer coupled with the load; a fifth isolation switch coupled with the third transformer; and a sixth isolation switch coupled with the third transformer. A third power source may be connectable with the second isolation switch, the third isolation switch, the fourth isolation switch, the fifth isolation switch or the sixth isolation switch. A second power source may be connected to the third isolation switch, a third power source may be connected to the fifth isolation switch, and wherein a fourth power source may be connectable with the second isolation switch, the fourth isolation switch or the sixth isolation switch.

The load may be divided equally among the power sources.

The power distribution system may include a room for the first power source, second power source, transformer, first isolation switch and second isolation switch and a separate room for the load.

The first power source and the second power source may be synchronizable by switching the first power source and the second power source to an internal bypass mode. The first power source and the second power source may both be connected to the same utility or the same generator.

According to a further aspect of the invention, a method of distributing power is provided. The method includes providing a transformer having a first isolation switch and a second isolation switch, a first source connected to the first isolation switch; connecting a second source to the second isolation switch; energizing the second source; and deenergizing the first source.

The method may also include setting the first source and the second source to an internal bypass mode before connecting the second source to the load by closing the second isolation switch.

The method may also include returning the second source to a normal mode after deenergizing the first source.

The method may also include redeploying on the first source circuit to the transformer after deenergizing the first source.

The method may also include providing a second transformer having a third isolation switch and a fourth isolation switch, the second transformer connected to a different load; and connecting the first source to the second transformer.

The method may also include providing a third transformer having a fifth isolation switch and a sixth isolation switch, the third transformer connected to a different load; connecting the first power source to the third transformer; and connecting a third power source to the second transformer.

According to another aspect of the invention, a power distribution unit is provided that includes a transformer having an input and an output, the output of the transformer configured to be connected to a load; a first isolation switch connected to the input of the transformer; and a second isolation switch connected to the input of the transformer.

A first source may be connectable to the first isolation switch and a second source may be connectable to the second isolation switch.

The transformer, first isolation switch and second isolation switch may be located in proximity to the first source and the second source and separate from the load.

The first isolation switch and the second isolation switch may be manual switches or automatic switches.

According to another aspect of the invention, a method is provided that includes providing a transformer having a first isolation switch and a second isolation switch, a first power source connected to the first isolation switch and a second power source connected to the second isolation switch; synchronizing a first power source and a second power source; energizing the second power source to the transformer by closing the second isolation switch; and de-energizing the first power source.

The method may also include redeploying a load on the transformer after de-energizing the first power source.

The method may also include providing a second transformer having a first isolation switch and a second isolation switch; and connecting the first power source to the second transformer.

According to a further aspect of the invention, a method is provided for scaling a power distribution system. The method includes connecting a first transformer to a load, the first transformer comprising a first transformer, a first isolation switch and a second isolation switch; connecting a first power circuit to the first isolation switch; connecting a second transformer to the load, the second transformer comprising a second transformer, a third isolation switch and a fourth isolation switch; and connecting a second power circuit to the third isolation switch.

The method may also include connecting a third transformer to the load, the third transformer comprising a third transformer, a fifth isolation switch and a sixth isolation switch.

The method may also include connecting a third power circuit to the fifth isolation switch.

The method may also include connecting a third power circuit to the fourth isolation switch and connecting the second power source to the fifth isolation switch.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

Figure 1:
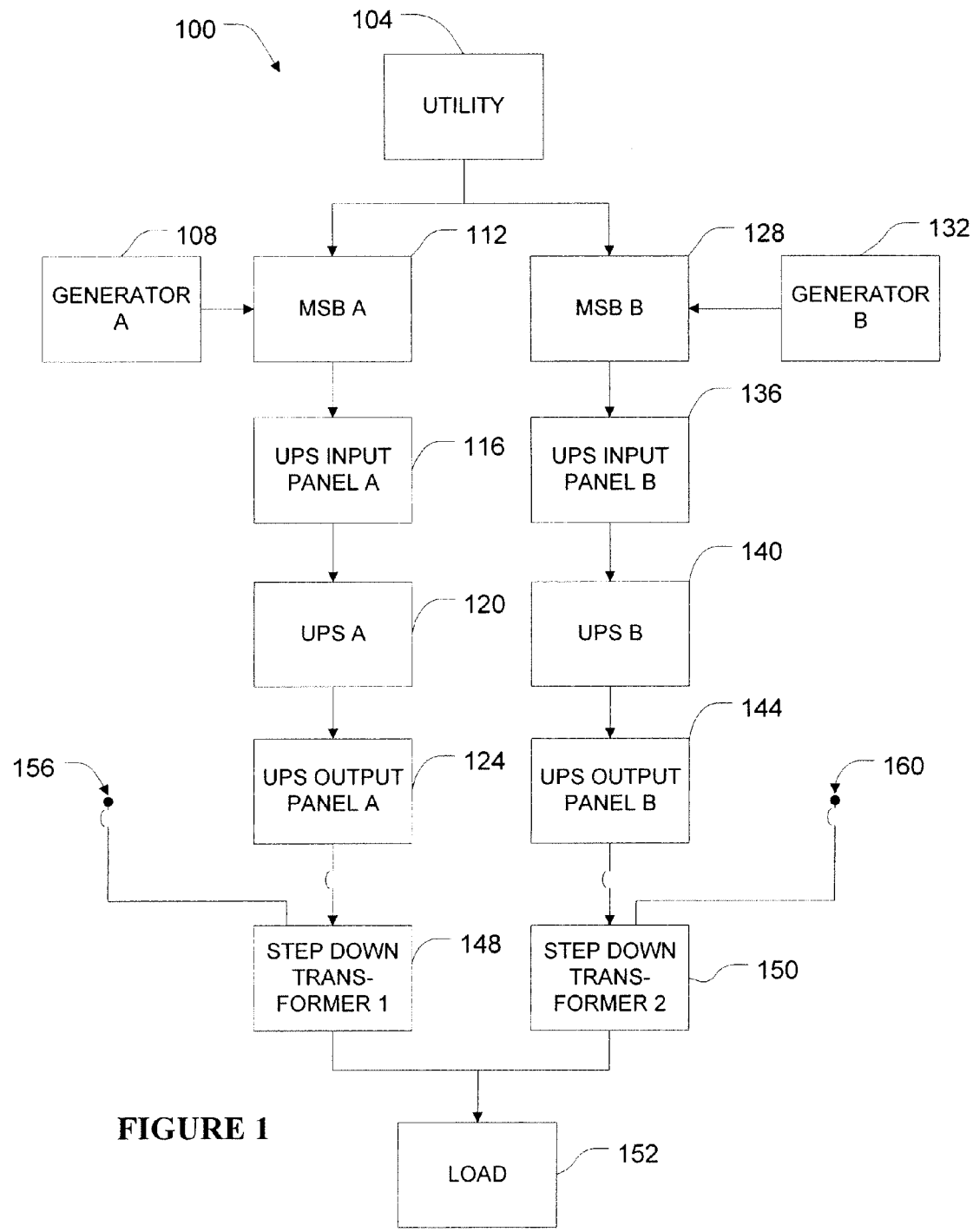
FIG. 1 is a block diagram of the scalable power distribution system in accordance with one embodiment of the invention.

An embodiment of the invention will now be described in detail with reference to FIG. 1. FIG. 1 illustrates an exemplary power distribution system 100. The power distribution system 100 includes a connection to a utility 104 and a generator A 108 that are both connected to a main switch board (MSB) A 112. The MSB A 112 is connected to an uninterruptible power supply (UPS) input panel A 116 that is connected to a UPS A 120, which is connected to a UPS Output panel A 124. Similarly, the utility 104 and generator B 132 are connected to the MSB B 128. The MSB B 128 is connected to a UPS input panel B 136, UPS B 140 and UPS Output Panel B 144. The UPS Output Panel A 124 is connected to a first step down transformer (hereinafter referred to as "transformer") 148, and the Output Panel B 144 is connected to a second transformer 150. The transformers 148, 150 are connected to a load block 152. The first transformer 148 also includes an open connection 156 and the second transformer 150 includes an open connection 160.

The MSB 112 includes a programmable logic controller (PLC) that controls the source of power and the way in which the power is distributed. The primary power source is typically the utility. In the event that the MSB A 112 and MSB B 128 detect a failure of the connection to the utility 104, the MSB A 112 turns on the generator A 108 and the MSB B 128 turns on the generator 132 to provide power to the UPS A and B 120, 140, respectively.

The UPSs 120, 140 are configured to provide a continuous source of power to the load 152. The UPSs 120, 140 include a first input at the input panel 116, 136 that provides the input power to a rectifier that produces direct current (DC) which is converted back to alternating current (AC) by an inverter connected to the output panel 124, 144. The UPSs 120, 140 include a second input at the input panel 116, 136. The second input is an "internal bypass" that bypasses the rectifier and inverter, directly connecting the input panel 116, 146 to the output panel 124, 144. The UPSs 120, 140 also include a battery (not shown) connected to the DC bus between the rectifier and inverter, that provides a power source to the inverter in the event that the rectifier input is lost. This typically happens with a utility failure until the generator starts up and provides backup power to the input panel. The input panel 116, 136 includes circuit breakers that connect the power to the first input and the second input (i.e., bypass input). The input panel 116, 136 may also include an additional circuit breaker that can connect the input panel to the output panel through an external bypass circuit (not shown). The output panel 124, 144 also includes circuit breakers that connect power from the UPS 120, 140 to the load 152. It will be appreciated that the load, represented as a single block, typically includes multiple circuits, each circuit having a dedicated circuit breaker in the output panel.

Figure 1A:
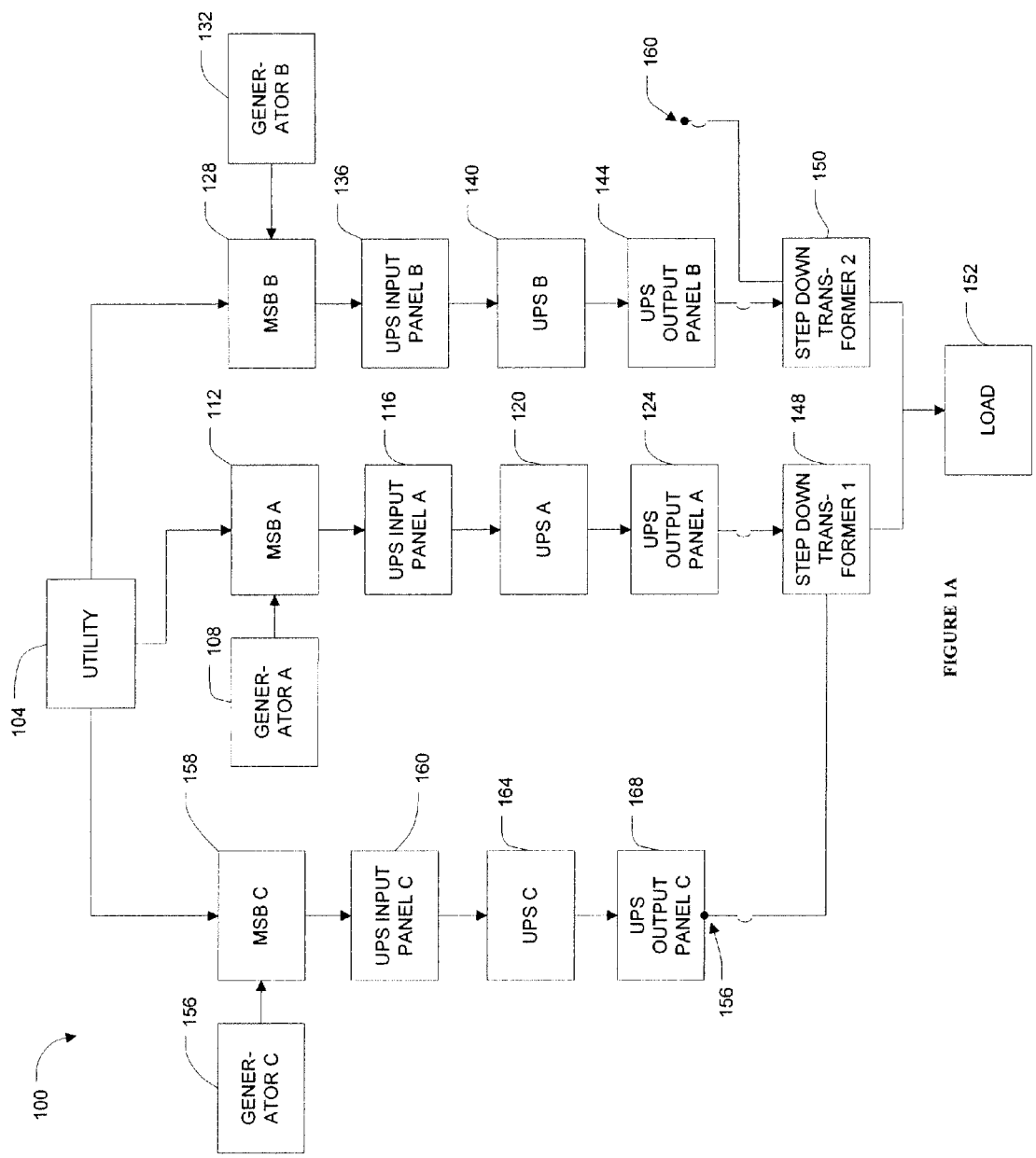
FIG. 1A is a block diagram of the scalable power distribution system in accordance with one embodiment.

The transformers 148, 150 allow the location of sources (e.g., UPSs 120, 140) in the facility to be changed without interrupting power or affecting the redundancy of the system. Another source can be connected to the open connection 156 and/or open connection 160 to change the source of power. For example, the sources (e.g., UPSs 120, 140) connected to the load block 152 can be changed from A-B to B-C. FIG. 1A illustrates replacement of the UPS input panel A 116, UPS A 120, UPS output panel A 124 and generator A 108 with the UPS Input panel C 160, UPS C 164 and UPS Output panel C 168. When the sources connected to the load 152 are changed, the UPS to be replaced (e.g., UPS A 120) and the replacement UPS (e.g., UPS C 164) are switched to an internal bypass mode. That is, the power flows in the second input of the UPSs 120, 164 and directly to the output panels 124, 168. The replacement UPS (e.g., UPS C 164) is then connected to the open connection 156 of the transformer 148, and the replaced UPS (e.g., UPS A 120) is de-energized. This replacement of source A with source C occurs without any effect on the load block 152.

It will be appreciated that although the above description refers to switching the UPS to be replaced and the replacement UPS to an internal bypass mode, it is not necessary to switch the UPS to be replaced and the replacement UPS to the internal bypass mode. However, UPS manufacturer's typically suggest switching the UPS to the internal bypass mode when making circuit connection changes to protect the UPS from any potential damage resulting from misconnections when the changes are being made.

Figure 2:
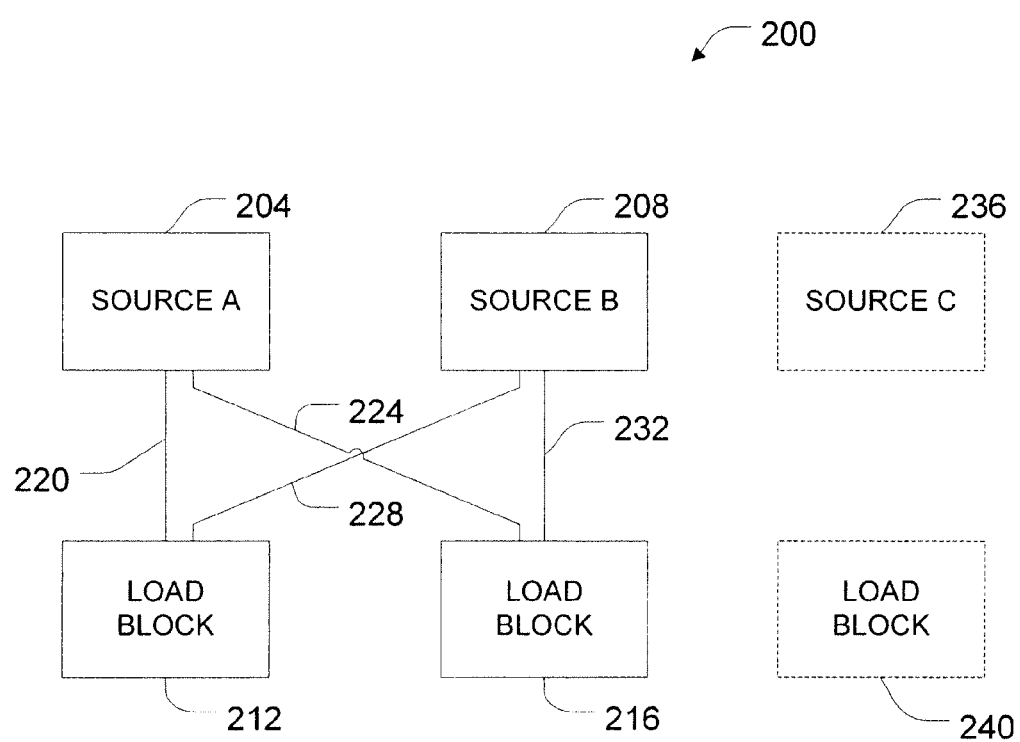
FIG. 2 is a block diagram of a scalable power distribution system in accordance with one embodiment of the invention.

The power distribution system can also be modified to include additional sources by adding additional transformers. FIG. 2 illustrates a power distribution system 200 with a first source 204 and a second source 208 connected to a first load block 212 and a second load block 216. As shown in FIG. 2, in order to provide the redundant source-load connection, the first source 204 is connected to the first load block 212 and the second load block 216 through connections 220, 224, respectively; and, the second source 208 is connected to the first load block 212 and the second load block 216 through connections 228, 232, respectively.

In order to add a third source 236 and a third load block 240 (i.e., scale the power distribution system 200), and maintain redundancy in the system, the connections between the sources and load blocks need to be changed. That is, in order to maintain two source connections to each load block, the connections to either or both sources 204 and 208 need to be changed. Simply connecting the third source 236 to the load block 240 alone is not acceptable because the load block 240 would only be connected to one source (i.e., no redundancy). Simply connecting the load block 240 to the sources 204, 208 is not acceptable because each source (A and B) would be connected to three loads while source C would have no load (i.e., not balanced).

Figure 2A:
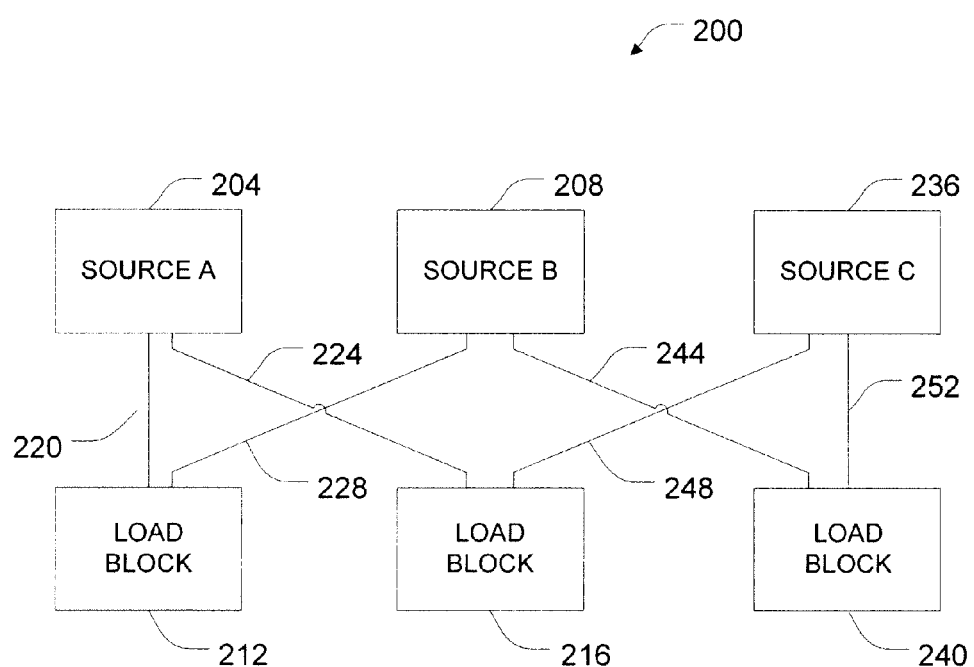
FIG. 2A is a block diagram of a scalable power distribution system in accordance with one embodiment of the invention.

FIG. 2A illustrates the addition of the third UPS 236 and the third load block 240 to the system 200 of FIG. 2. As shown in FIG. 2A, the second UPS 208 is connected to the first load block 212 and the third load block 240 through connections 228, 244, respectively, and the third UPS 236 is connected to the second load block 216 and the third load block 240 through connections 248, 252, respectively. This addition of the third source 236 and load block 240 requires a change of connections at the second UPS 208, which is accomplished, according to features of the invention, without a loss of redundancy by connecting the sources to the transformer as described above with reference to FIGS. 1 and 1A. It will be appreciated that the connections shown are exemplary and that different connections could have been made between the sources 204, 208, 236 and the load blocks 212, 216, 240 to achieve the same balanced load effect.

Figure 3:
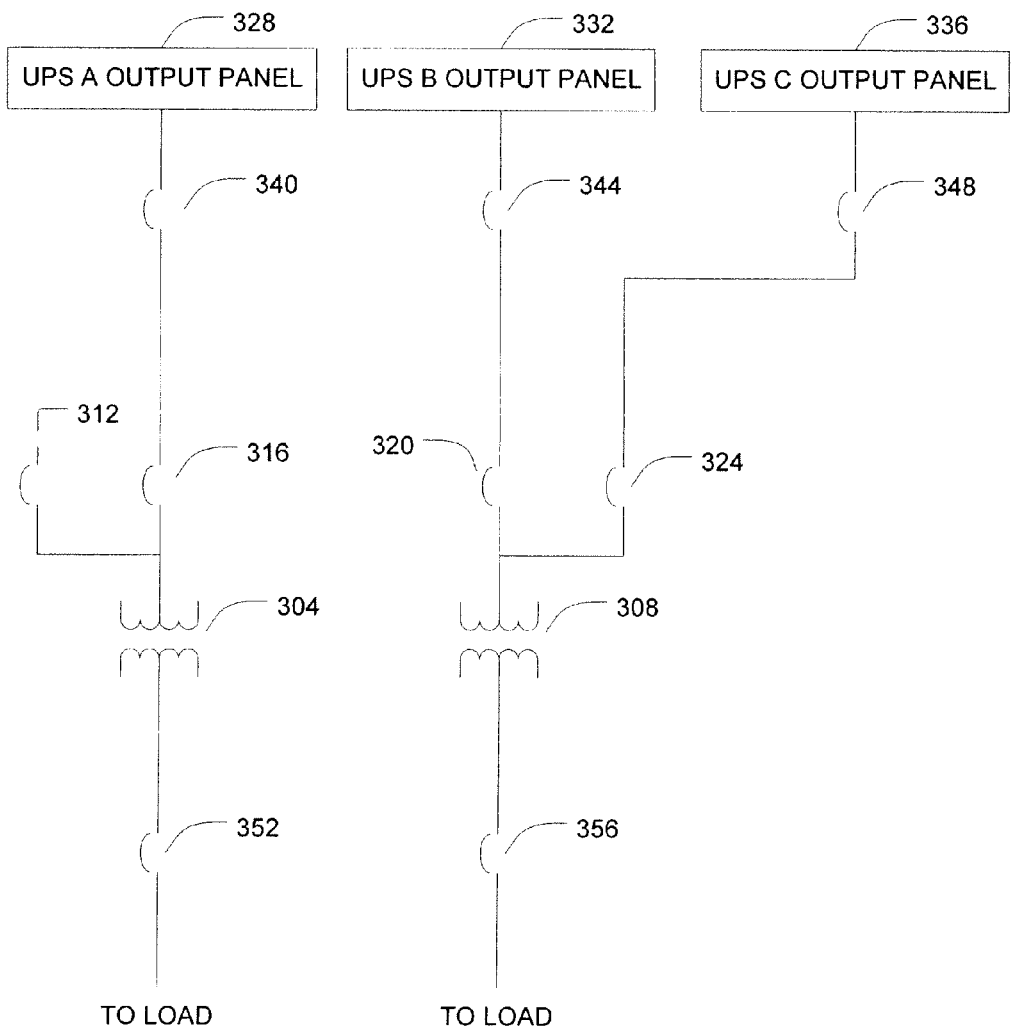
FIG. 3 is circuit diagram of a scalable power distribution system in accordance with one embodiment of the invention.

FIG. 3 illustrates the transformer in the power distribution system in further detail. In particular, FIG. 3 shows the transformer during a change in connections when an additional source is being added.

In FIG. 3, the power distribution system includes a first transformer 304 and a second transformer 308. The first transformer 304 includes a first isolation switch 312 and a second isolation switch 316; and, the second transformer 308 includes a first isolation switch 320 and a second isolation switch 324. UPS A output panel 328 is shown connected to isolation switch 316, UPS B output panel 332 is connected to isolation switch 320 and UPS C output panel 336 is connected to isolation switch 324. Primary circuit breakers 340, 344, 348 are provided between respective ones of the UPS output panels 328, 332, 336 and the transformers 304, 308. Secondary circuit breakers 352, 356 are also provided between the load 300 and each of the transformers 304, 308, respectively. The secondary circuit breakers 352, 356 are generally closed to maintain uninterrupted power flow to the load.

In order to add a third source and a third load block (i.e., scale the power distribution system) and maintain redundancy in the power distribution system, the connections between the sources and load blocks need to be changed. As shown in FIG. 3, this is accomplished by connecting the UPS C output panel 336 to the isolation switch 324 connected to the second transformer 308. The transformer 308 is also connected to the UPS B output panel 332. The UPS C source is energized by closing isolation switch 324, and the UPS B source is then deenergized (by opening isolation switch 320) to change the source connected to the transformer 308. Thus, the source connected to the second transformer 308 can be changed from UPS B to UPS C without any affect on the load.

Figure 4:
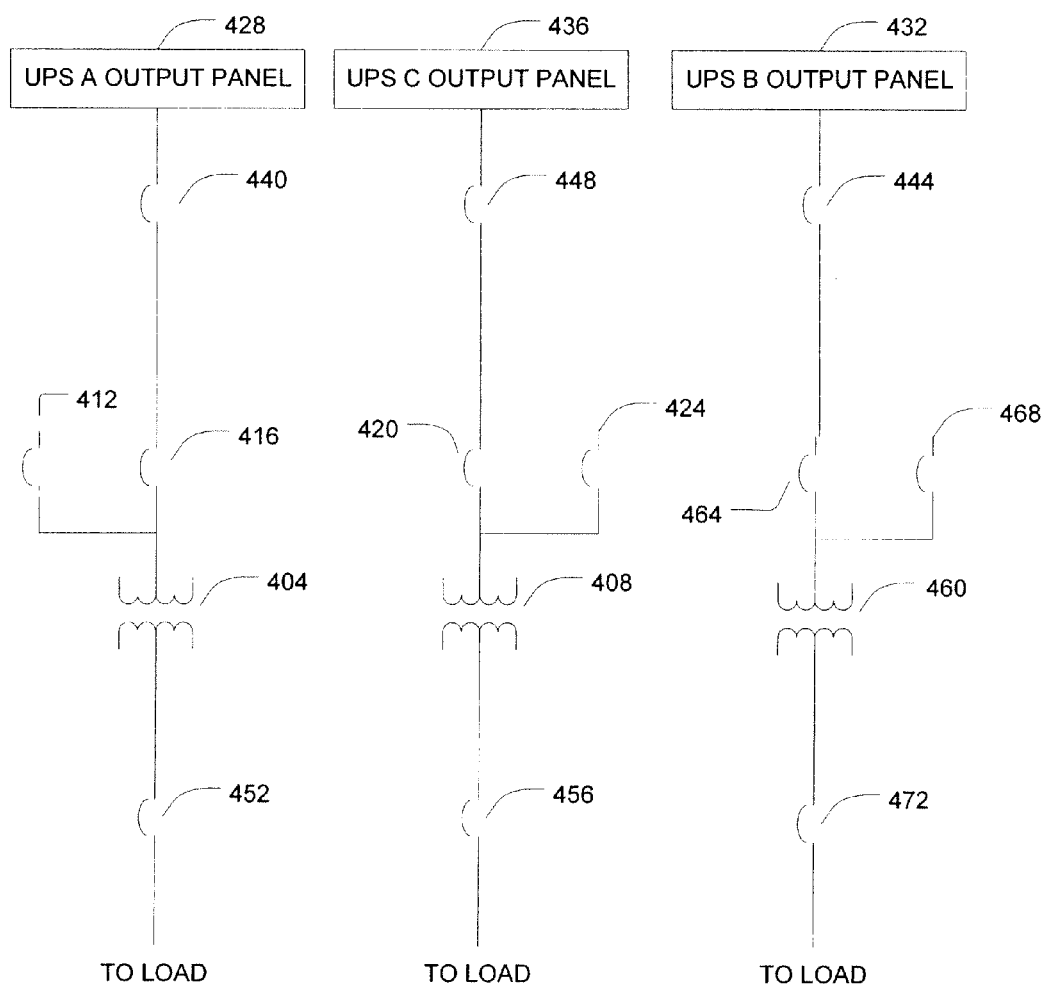
FIG. 4 is a circuit diagram of the scalable power distribution system in accordance with one embodiment of the invention.

FIG. 4 illustrates the addition of an additional transformer to increase the number of sources that can be connected to the power distribution system. In FIG. 4, the power distribution system includes a first transformer 404, a second transformer 408 and a third transformer 460. The first transformer 404 includes a first isolation switch 412 and a second isolation switch 416; the second transformer 408 includes a first isolation switch 420 and a second isolation switch 424; and, the third transformer 460 includes a first isolation switch 464 and a second isolation switch 468. UPS A output panel 428 is shown connected to isolation switch 416, UPS C output panel 436 is shown connected to isolation switch 420 and UPS B output panel 432 is shown connected to isolation switch 464.

Primary circuit breakers 440, 444, 448 are provided between respective ones of the UPS output panels 428, 432, 436. Secondary circuit breakers 452, 456, 472 are also provided between the load and each of the transformers 404, 408, 460 respectively. As described above, the secondary circuit breakers 452, 456, 472 are generally closed. The primary circuit breakers are open or closed depending on the source-load combination while maintaining N+1 redundancy.

Thus, UPS B connected to the UPS B output panel 432 can be connected to the third transformer 460 after it has been disconnected from the second transformer 408 as described above with reference to FIG. 3. The UPS B output panel 432 can be connected to either isolation switch 464 or 468.

It will be appreciated that additional sources and transformers can continue to be added to the power distribution system to continue scaling (increasing total power to) the power distribution system, as described above. The connections between at least some of the sources and loads are changed each time a new source is added to the system to maintain load balance and redundancy in the power distribution system without affecting the power to the load.

Figure 5A:
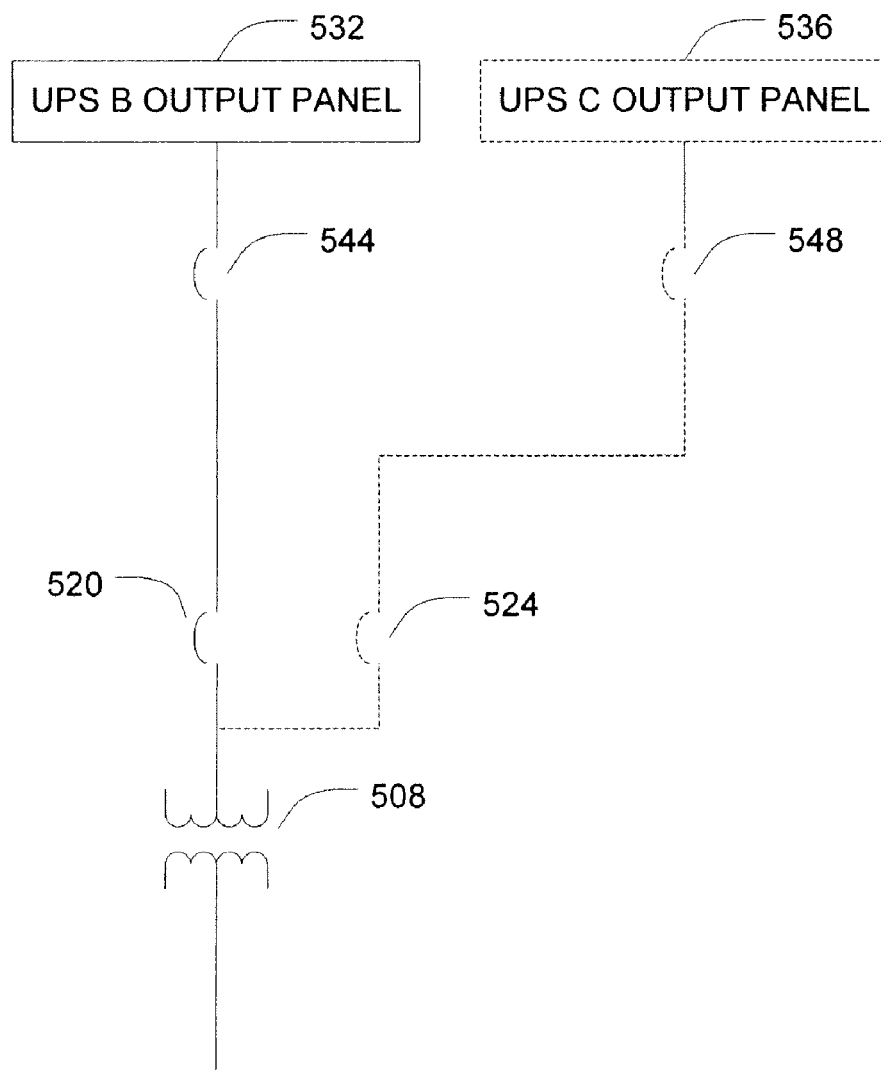
FIGS. 5A-5C are circuit diagrams of the scalable power distribution system in accordance with one embodiment of the invention.
Figure 5B:
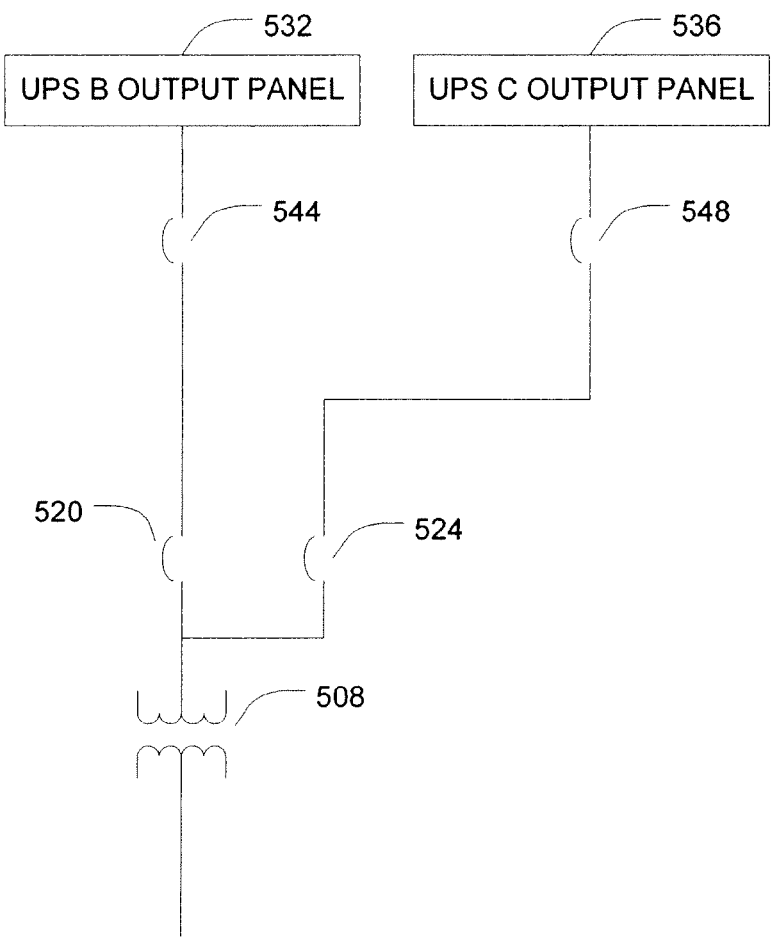
Figure 5C:
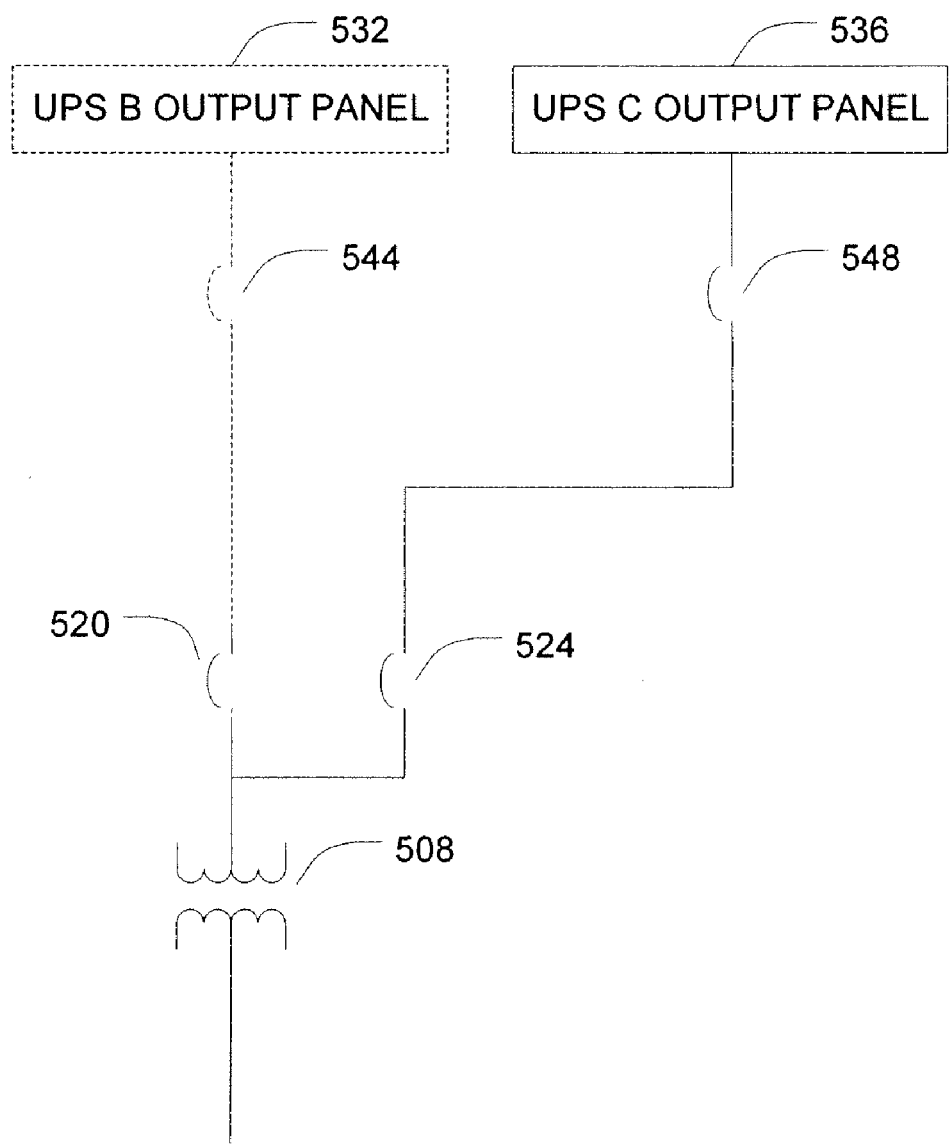

FIGS. 5A-5C illustrate changing the source connection at the transformer in further detail. In FIG. 5A, the UPS B output panel 532 is wired to the transformer 508 through the first isolation switch 520. The UPS C output panel 536 is connected to the second isolation switch 524 of the transformer 508 while the circuit from the UPS C output panel 536 is de-energized (dashed line). The UPS C circuit is then energized by closing circuit breaker 548, followed by placing both UPS systems in internal bypass mode, synchronizing UPS B 532 and UPS C 536 to the transformer 508, as shown in FIG. 5B. Because UPS B 532 and UPS C 536 are synchronized at the transformer 508, the power source to the load 500 can be changed without effecting the power supplied to the load 500. After UPS B 532 and UPS C 536 are synchronized, the UPS B 532 circuit can be de-energized at circuit breaker 520 and disconnected (dashed line), as shown in FIG. 5C. After the sources are changed, the circuit breaker 520 can be used for a new circuit, can be rerun to a different load, or rebalanced, as needed.

It will be appreciated that the number of transformers and switches required in the system depends on the number of sources connected to the load and the number of load blocks each served by a transformer (such as 508 in FIGS. 5A to 5C), which is determined by the load requirements. In addition, it will be appreciated that the configuration and connection can vary depending on the power requirements of the facility, as described above.

Figure 6:
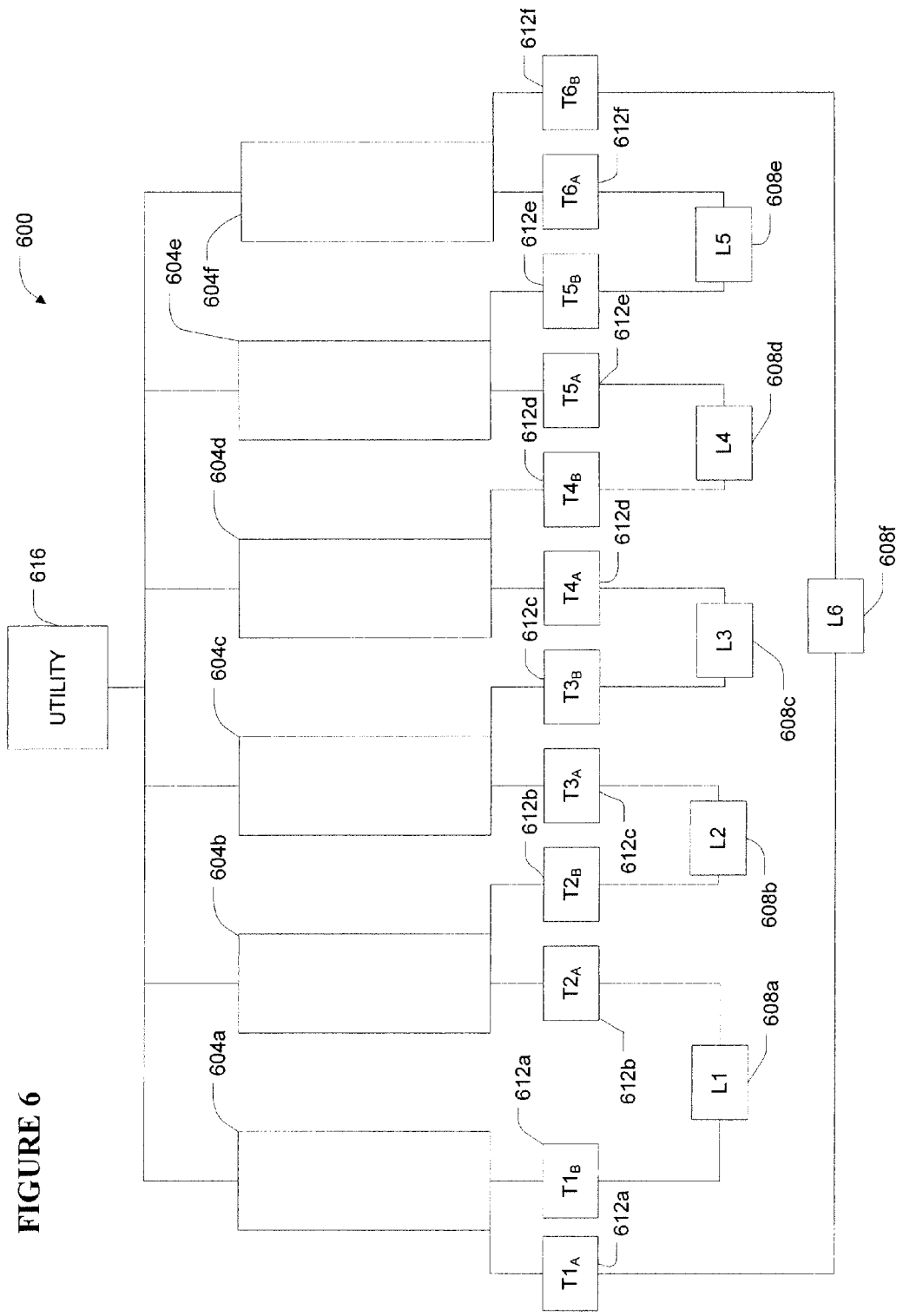
FIG. 6 is a block diagram of the scalable power distribution system in accordance with one embodiment of the invention.

FIG. 6 illustrates a configuration for a scaled power distribution system with six power sources 604 (first power source 604a, second power source 604b, third power source 604c, fourth power source 604d, fifth power source 604e and sixth power source 604f). Six sources in a distributed redundant system are considered the practical limit. The sources are connected to the representative load 608 (load block 608a, load block 608b, load block 608c, load block 608d, load block 608e and load block 608f). It is appreciated that that these load blocks will normally be more numerous than those shown. Each load block is connected to its two power sources by transformers that step the voltage down from the UPS source voltage (typically 480V) to the utilization voltage (typically 120/208V). It is at the input to these transformers that the two isolation switches depicted in FIGS. 3, 4, and 5 are installed.

With six power sources as shown in FIG. 6, there are 15 distinct combinations of two sources to serve dual source loads. Six of those 15 combinations are represented (load L1 from source 604a/b through transformers T1B and T2A, load L2 from source 604b/c through transformers T2B and T3A, load L3 from source 604c/d through transformers T3B and T4A, load L4 from source 604d/e through transformers T4B and T5A, load L5 from source 604e/f through transformers T5B and T6A, and load L6 from source 604a/f through transformers T1A and T6B). It will be appreciated that there are nine other possible combinations not shown in FIG. 6 (source 604a/c, 604a/d, 604a/e, 604b/d, 604b/e, 604b/f, 604c/e, 604c/f, and 604d/f). In addition, it will be appreciated that the evolution of system 600 as described above could have begun with only source 604a and 604b, then added 604c, then added 604d, then added 604e, then ultimately added 604f while adding load blocks that had to be moved from one source to another at each step of the process, with reference to FIGS. 1-5C. For example, the two left-most sources (604a and 604b) can be viewed as the first and second sources in FIG. 2. A third source can then be added by changing the connections between the sources 604a/604b and source 604c as described above with reference to FIG. 2A.

The system described above allows deployment of a distributed redundant system with two elements (N=1) to grow step by step from N=1 to N=4 or more (e.g., N=5 in FIG. 6). The system also allows the source connections for the two-source loads to be changed from one source to another to maintain proper balance and maximize total output capacity, without the need to deenergize the critical load or reduce the level of redundancy of the system.

Figure 7:
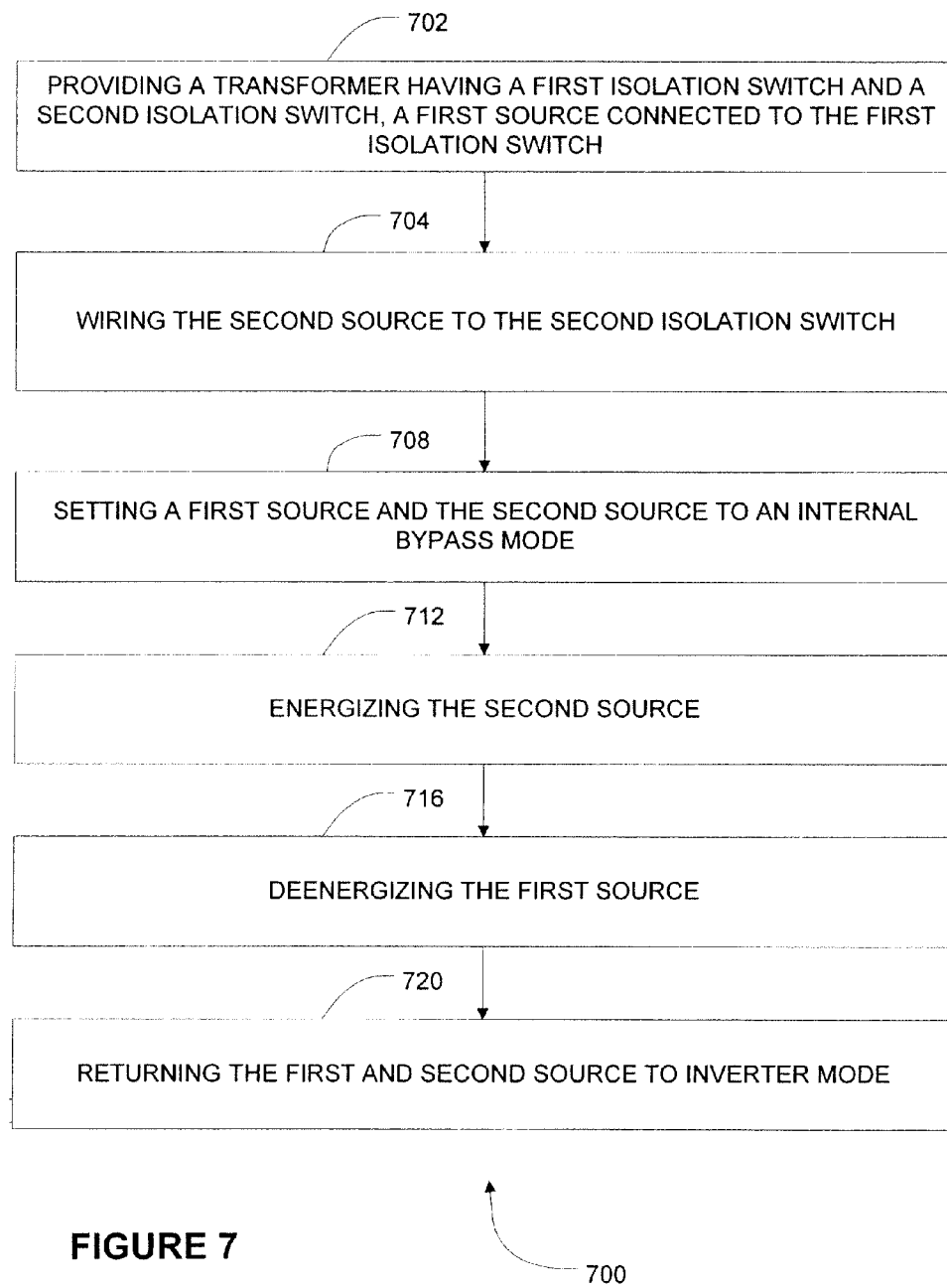
FIG. 7 is a flow diagram of method for scaling power distribution in accordance with one embodiment of the invention.

FIG. 7 illustrates a process for scaling a power distribution system 700. It will be appreciated that the steps of the process 700 described below may have a different order. In addition, it will be appreciated that the process 700 may include fewer steps or additional steps.

The process 702 beings by providing a transformer having a first isolation switch and a second isolation switch, a first source connected to the first isolation switch (block 702). For example, as shown in FIG. 5A, UPS B is connected to the transformer through a first isolation switch.

The process 700 continues by wiring the second source to the second isolation switch (block 704). For example, UPS output panel C can be wired to the second isolation switch of the transformer as shown and described above with reference to FIG. 5A.

The process 700 continues by setting a first source and a second source to an internal bypass mode (block 708). For example, UPS B and UPS C are changed to internal bypass mode by connecting internally between the bypass input and the output, bypassing the rectifier and inverter for both of UPS B and UPS C. This "internal bypass" mode of operation is initiated from the control panel on the front of the UPS.

The process 700 continues by energizing the second source (block 712). For example, with reference to FIG. 5B, UPS C connected to UPS output panel C can be energized.

The process 700 continues by deenergizing the first source (block 716). For example, with reference to FIG. 5C, UPS B connected to UPS B output panel B can be de-energized.

The process continues by removing both UPS systems from internal bypass mode and placing both in inverter (normal) mode (block 720). Thus, the configuration of sources in the facility is changed without affecting the critical load or changing the redundancy of the system.

The first source can then be connected to another transformer without affecting the redundancy of the system or the critical load. For example, as described above with reference to FIGS. 2A and 4, additional transformers can be added to scale (add capacity to) the power distribution system. It will be appreciated that additional sources and transformers can be added to the system to further scale the power distribution system without affecting the redundancy of the system or the critical load.

Figure 8:
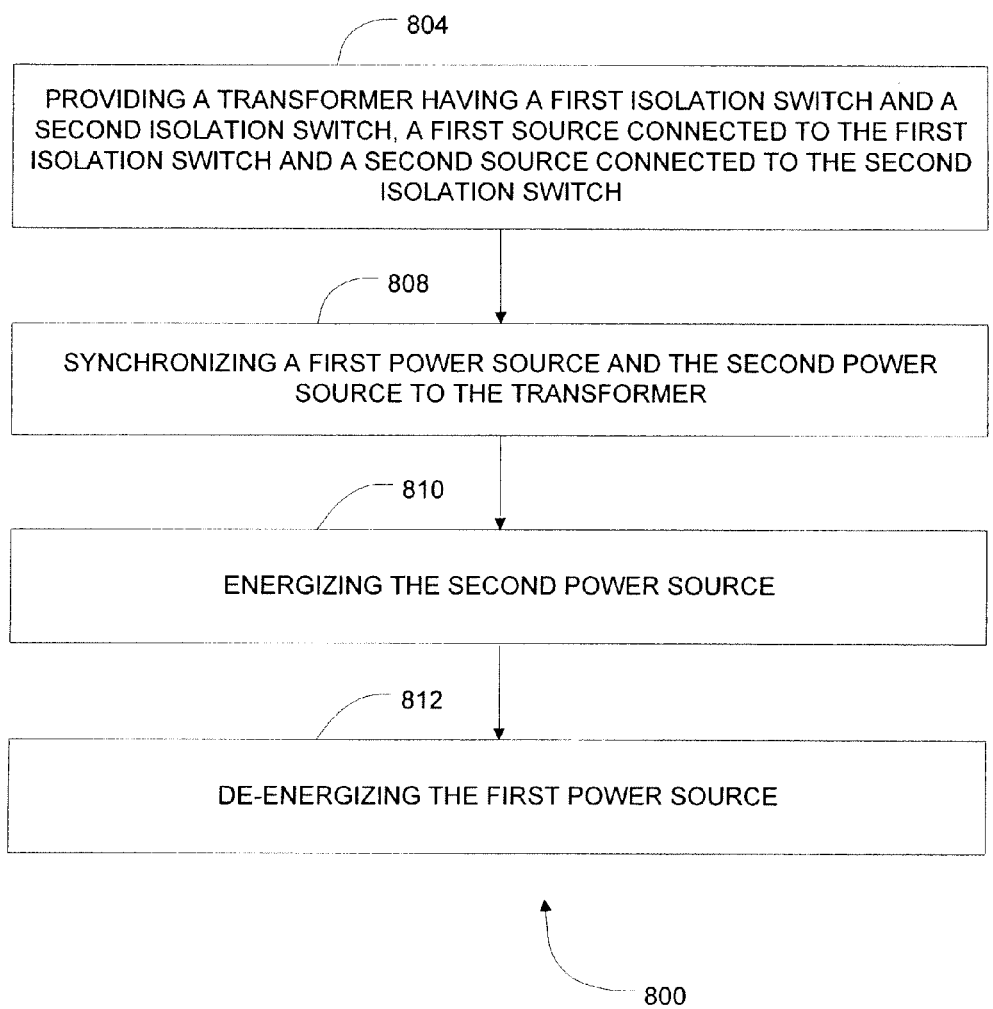
FIG. 8 is a flow diagram of a method for scaling power distribution in accordance with one embodiment of the invention.

FIG. 8 illustrates a process for scaling a power distribution system 800. It will be appreciated that the steps of the process 800 described below may have a different order. In addition, it will be appreciated that the process 800 may include fewer steps or additional steps.

The process 800 begins by providing a transformer having a first isolation switch and a second isolation switch, a first source connected to the first isolation switch and a second source connected to the second isolation switch (block 804). For example, as shown in FIG. 5A, UPS B and UPS C are connected to the transformer.

The process 800 continues by synchronizing a first power source and a second power source to a transformer (block 808) and energizing the second power source (block 810). For example, with reference to FIG. 5B, UPS C connected to UPS output panel C can be energized such that both UPS B and UPS C are connected to the transformer while energized in the internal bypass mode (i.e., synchronized).

The process 800 continues by deenergizing the first power source (block 812). For example, with reference to FIG. 5C, UPS B connected to UPS B output panel B can be de-energized. Thus, the source connected to the transformer is changed from the first power source to the second source without affecting the critical load or changing the redundancy of the system.

The first source can then be connected to another transformer to change the configuration without affecting the redundancy of the system or the critical load. For example, as described above with reference to FIGS. 2A and 4, additional transformers can be added to scale the power distribution system. It will be appreciated that additional sources and transformers can be added to the system to further scale the power distribution system without affecting the redundancy of the system or the critical load.

An advantage of the systems and methods described above is the deployment of a small system, with growth in steps, while maintaining maximum possible N+1 output capacity and no temporary loss of critical load or reduction in redundancy. In addition, the systems and methods allow initial deployment of the least cost N+1 system with sellable KW at the maximum level, then growth of the system in the least costly steps, again maintaining the highest possible sellable KW, N+1 redundancy, and no critical load shutdowns. The systems and methods ensure the highest return on investment at the earliest time possible, with the least initial cost, all without sacrificing any reliability, even temporarily.

In the above systems and methods, the UPS output distribution does not run through a traditional power unit (PDU). These conventional PDUs typically employ a 480V to 120/208V transformer with branch circuit panel boards connected to the output. For a dual source configuration, two transformers and two sets of output panel boards or two entirely separate PDUs are required in the conventional system. In contrast, the systems and methods described above separate the transformer and output distribution so the transformer is not located on the data floor, reducing heat load and space consumption.

In addition, because the transformer includes two isolation switches, a second circuit can be safely terminated to the transformer at any time. Furthermore, through site specific programming code running in the programmable logic controllers (PLCs), the distribution system is able to be switched so that any two UPS module outputs can be synchronized to each other to the extent that the outputs can be temporarily paralleled (connected together while both energized). Using the features described above, two sources can be brought to the same critical load transformer, temporarily paralleled, and the initial circuit then turned off, leaving the new circuit connected. The significance of the ability to change a transformer input circuit from one source to another is that changes in load connectivity can be achieved without outage or the risk of less redundancy. A two-source load connected to the A and B source can have the B source changed to C without interruption of either source to the load. Because of the dual primary isolation switches on every transformer, and the control of the source synchronization, sources to two source loads can be changed multiple times as the overall system grows, allowing for optimum balance and overall capacity.

Figure 9:
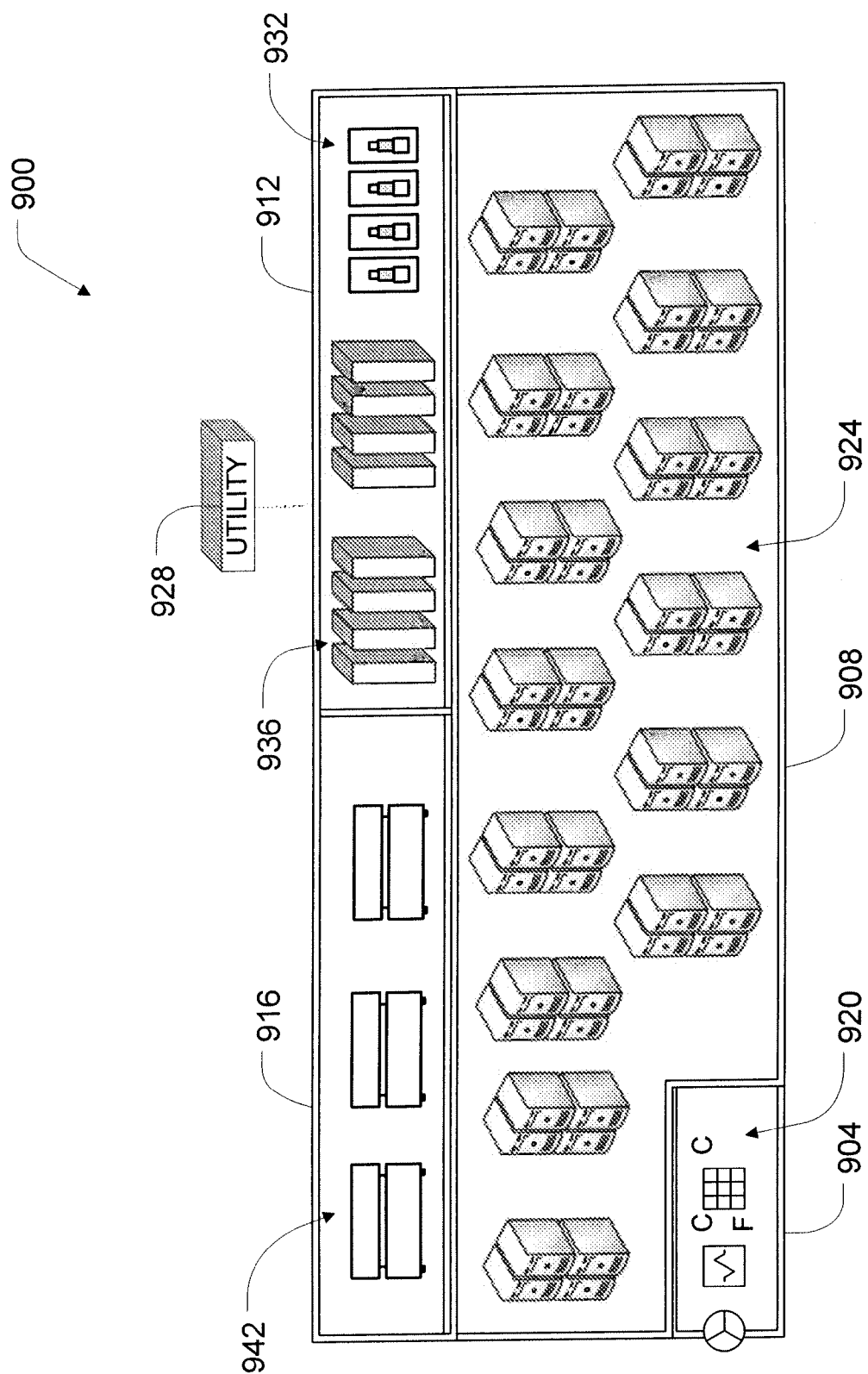
FIG. 9 is a schematic view of a data center in accordance with one embodiment of the invention.

An exemplary facility that may include the redundant isolation power distribution system as described above is a data center, such as the data center shown in FIG. 9. Data centers have become increasingly popular for storing and/or processing electronic data. Data centers typically include hundreds or even thousands of server computers and other information technology (IT) equipment capable of handling data for the data center's customers, requiring an elaborate power distribution system to consistently handle powering and cooling the server computers and other information technology (IT) equipment.

The illustrated data center 900 includes a secure entrance 904, a load room 908, a power distribution room 912 and a mechanical room 916. The secure entrance 904 includes security features 920 to control access of individuals into the load room 908. The security features 920 may include, for example, on-site security, surveillance cameras, proximity cards, pin pads, biometric iris scanners, mantrap portals, revolving doors, etc, and combinations thereof. The load room 908 includes a plurality of servers 924 to store and process data as required by customers of the data center and/or operators of the data center. It will be appreciated that the number of server computers and other information technology (IT) equipment depends on the requirements of the data center's customers and that additional components may be included in the load room.

The power distribution room 912 includes a connection to a utility 928, generators 932 and power distribution equipment 936. The utility 928 is the primary source of power to the power distribution equipment 936. The generators 932 are a secondary source of power to the power distribution equipment 936. The generators 932 typically provide power to the power distribution equipment 936 in case of a failure of the utility or the connection to the utility 928. The power distribution equipment 936 is configured to distribute power from the utility 928 and/or generator 932 to the servers 924 in the load room 908. The power distribution equipment 936 may include, for example, MSBs, UPSs, circuit breakers, etc.

The mechanical room 916 includes mechanical equipment to control the temperature of the load room 908. The mechanical equipment may include chillers 942 and plumbing connected the chillers 942 to the load room 908. It will be appreciated that the mechanical room 916 may include other types of mechanical equipment for cooling the load room 908.

By modifying the power distribution system of the data center 900 to include the transformer described above with reference to FIGS. 1-8, the ability of a data center to continuously power and cool server computers and other information technology (IT) equipment can be maintained. In addition, the transformer can be positioned in the power distribution room 912 as opposed to on the floor, further minimizing the cooling costs and increasing floor space.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive.

The present invention has been described in relation to particular examples, which are intended in all respects to be illustrative rather than restrictive. Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A scalable power distribution system comprising:
a transformer coupled with a load;
a first isolation switch connected to an input of the transformer;
a second isolation switch connected to the input of the transformer; and
a first uninterruptible power supply (UPS) connected to the first isolation switch;
a second transformer coupled with the load;
a third isolation switch coupled with the second transformer; and
a fourth isolation switch coupled with the second transformer,
wherein a second uninterruptible power supply (UPS) is connectable with the second isolation switch, wherein each of the first uninterruptible power supply (UPS) and the second uninterruptible power supply (UPS) comprise a rectifier and an inverter and are configured to supply alternating current (AC) power to the load through the transformer, the second uninterruptible power supply (UPS) and the first uninterruptible power supply (UPS) synchronizable at the transformer, and
wherein the second uninterruptible power supply (UPS) is connected to the first isolation switch and wherein the first uninterruptible power supply (UPS) is connected to the third isolation switch.

2. The system of claim 1, wherein the first isolation switch and the second isolation switch are manual switches.

3. The system of claim 1, wherein the first isolation switch and the second isolation switch are automatic switches.

4. The system of claim 1, wherein the load is divided equally between the first uninterruptible power supply (UPS) and the second uninterruptible power supply (UPS).

5. The system of claim 1, wherein the load is divided equally among the first uninterruptible power supply (UPS), the second uninterruptible power supply (UPS) and a third uninterruptible power supply (UPS), the third UPS connected to the first isolation switch or the second isolation switch.

6. The system of claim 1, wherein the power distribution system comprises a room for the first uninterruptible power supply (UPS), second uninterruptible power supply (UPS), transformer, first isolation switch and second isolation switch and a separate room for the load.

7. The system of claim 1, wherein the first uninterruptible power supply (UPS) and the second uninterruptible power supply (UPS) are synchronizable at the transformer by switching the first uninterruptible power supply (UPS) and the second uninterruptible power supply (UPS) to an internal bypass mode.

8. The system of claim 7, wherein the first uninterruptible power supply (UPS) and the second uninterruptible power supply (UPS) are both connected to a utility.

9. The system of claim 7, wherein the first uninterruptible power supply (UPS) and the second uninterruptible power supply (UPS) are both connected to a generator.

10. The system of claim 1, wherein the first UPS and the second UPS are configurable to operate in an internal bypass mode.

11. The system of claim 1, wherein the first UPS and the second UPS are each connected to a battery.

12. A scalable power distribution system comprising:
a transformer coupled with a load;
a first isolation switch connected to an input of the transformer;
a second isolation switch connected to the input of the transformer;

a first uninterruptible power supply (UPS) connected to the first isolation switch;
a second transformer coupled with the load;
a third isolation switch coupled with the second transformer; and
a fourth isolation switch coupled with the second transformer;
wherein a second uninterruptible power supply (UPS) is connectable with the second isolation switch, the second uninterruptible power supply (UPS) and the first uninterruptible power supply (UPS) synchronizable at the transformer, and wherein the second uninterruptible power supply (UPS) is connected to the first isolation switch and wherein the first uninterruptible power supply (UPS) is connected to the third isolation switch.

13. The system of claim 12, wherein the load is divided equally between the first uninterruptible power supply (UPS) and the second uninterruptible power supply (UPS).

14. The system of claim 12, wherein the load is divided equally among the first uninterruptible power supply (UPS), the second uninterruptible power supply (UPS) and a third uninterruptible power supply (UPS), the third UPS connected to the first isolation switch or the second isolation switch.

15. The system of claim 14, wherein the first uninterruptible power supply (UPS) and the second uninterruptible power supply (UPS) are both connected to a utility.

16. The system of claim 14, wherein the first uninterruptible power supply (UPS) and the second uninterruptible power supply (UPS) are both connected to a generator.

17. The system of claim 12, wherein the first uninterruptible power supply (UPS) and the second uninterruptible power supply (UPS) are synchronizable at the transformer by switching the first uninterruptible power supply (UPS) and the second uninterruptible power supply (UPS) to an internal bypass mode.

18. A power distribution unit comprising:
a first transformer having an input and an output, the output of the first transformer configured to be connected to a load;
a second transformer having an input and an output, the output of the second transformer configured to be connected to a load;
a first isolation switch connected to the input of the first transformer and a first uninterruptible power supply (UPS);
a second isolation switch connected to the input of the first transformer and connectable with a second uninterruptible power supply (UPS);
a third isolation switch connected to the input of the second transformer and connectable with the first uninterruptible power supply (UPS); and
a fourth isolation switch coupled with the input of the second transformer.

* * * * *